(12) United States Patent
Mack et al.

(10) Patent No.: US 11,902,273 B2
(45) Date of Patent: Feb. 13, 2024

(54) SYSTEM FOR DYNAMIC CHAFFING FOR LOG OBFUSCATION BASED ON SHIFTING EXPOSURE PORTFOLIO

(71) Applicant: BANK OF AMERICA CORPORATION, Charlotte, NC (US)

(72) Inventors: Nia Mack, Addison, TX (US); Brandon Sloane, Indian Land, SC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 525 days.

(21) Appl. No.: 17/216,864

(22) Filed: Mar. 30, 2021

(65) Prior Publication Data
US 2022/0321551 A1 Oct. 6, 2022

(51) Int. Cl.
H04L 9/32 (2006.01)
G06F 21/60 (2013.01)
H04L 9/40 (2022.01)
G06F 11/34 (2006.01)

(52) U.S. Cl.
CPC ........ H04L 63/083 (2013.01); G06F 11/3476 (2013.01); G06F 21/602 (2013.01); H04L 9/3242 (2013.01); H04L 2209/16 (2013.01)

(58) Field of Classification Search
CPC . H04L 63/083; H04L 9/3242; H04L 2209/16; G06F 11/3476; G06F 21/602
USPC .......................................................... 726/5
See application file for complete search history.

(56) References Cited

U.S. PATENT DOCUMENTS

| 6,877,146 | B1 | 4/2005 | Teig et al. |
|---|---|---|---|
| 8,146,133 | B2 | 3/2012 | Moon et al. |
| 8,159,966 | B1 | 4/2012 | Mabee et al. |
| 8,850,588 | B2 | 9/2014 | Kumar et al. |
| 8,874,550 | B1 | 10/2014 | Soubramanien et al. |
| 8,891,528 | B2 | 11/2014 | Moriarty et al. |
| 8,898,788 | B1 | 11/2014 | Aziz et al. |
| 9,324,119 | B2 | 4/2016 | Singh et al. |
| 2004/0243835 | A1 | 12/2004 | Terzis et al. |
| 2006/0265397 | A1 | 11/2006 | Bryan et al. |
| 2012/0065749 | A1 | 3/2012 | Hunter |
| 2012/0102543 | A1 | 4/2012 | Kohli et al. |
| 2012/0240185 | A1 | 9/2012 | Kapoor et al. |
| 2013/0173621 | A1 | 7/2013 | Kapoor et al. |
| 2014/0337862 | A1 | 11/2014 | Valencia et al. |
| 2015/0039513 | A1 | 2/2015 | Adjaoute |
| 2015/0055623 | A1 | 2/2015 | Li et al. |

(Continued)

Primary Examiner — Dereena T Cattungal
(74) Attorney, Agent, or Firm — Moore & Van Allen PLLC; Anup Shrinivasan Iyer

(57) ABSTRACT

Systems, computer program products, and methods are described herein for dynamic chaffing for log obfuscation based on shifting exposure portfolio. The present invention is configured to receive an event log from one or more sources associated with a resource, wherein the event log comprises one or more event records generated based on one or more action incidences; initiate a chaffing engine on the event log; generate, using the chaffing engine, one or more artificial records based on at least the one or more event records; tag the one or more artificial records and the one or more event records with one or more authentication codes; interleave, using the chaffing engine, the one or more artificial records and the one or more event records to generate an encrypted event log with one or more chaffed event records; and store the encrypted event log in an event database.

18 Claims, 3 Drawing Sheets

(56) References Cited

U.S. PATENT DOCUMENTS

| | | |
|---|---|---|
| 2015/0229654 A1 | 8/2015 | Perier |
| 2015/0293954 A1 | 10/2015 | Hsiao et al. |
| 2015/0295945 A1 | 10/2015 | Canzanese, Jr. et al. |
| 2016/0028750 A1 | 1/2016 | Di Pietro et al. |
| 2016/0036819 A1 | 2/2016 | Zehavi et al. |
| 2016/0119372 A1 | 4/2016 | Borlick et al. |
| 2021/0365191 A1* | 11/2021 | Schukai .................. G06F 3/067 |
| 2021/0377029 A1* | 12/2021 | Sloane .................. B62B 5/0013 |
| 2021/0377237 A1* | 12/2021 | Sloane .................. H04L 63/123 |
| 2022/0052957 A1* | 2/2022 | Sloane .................... H04L 9/085 |
| 2022/0156247 A1* | 5/2022 | Gururaj .................. G06N 3/088 |
| 2023/0315884 A1* | 10/2023 | Pham .................. G06F 21/6254 |
| | | 726/27 |

* cited by examiner

SYSTEM FOR DYNAMIC CHAFFING FOR LOG OBFUSCATION BASED ON SHIFTING EXPOSURE PORTFOLIO

FIELD OF THE INVENTION

The present invention embraces a system for dynamic chaffing for log obfuscation based on shifting exposure portfolio.

BACKGROUND

Understanding widespread security exposure allows entities to create security issue awareness but may not often be the best focus for security teams within the entities. Security and exposure management leaders may be benefitted from approaching the exposure landscape based on a continuous assessment of exposure and business evolutions and embrace a system for dynamic chaffing for log obfuscation based on shifting exposure portfolio.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for dynamic chaffing for log obfuscation based on shifting exposure portfolio is presented. The system comprising: at least one non-transitory storage device; and at least one processing device coupled to the at least one non-transitory storage device, wherein the at least one processing device is configured to: receive an event log from one or more sources associated with a resource, wherein the event log comprises one or more event records, wherein the one or more event records are generated based on one or more action incidences; initiate a chaffing engine on the event log; generate, using the chaffing engine, one or more artificial records based on at least the one or more event records; tag the one or more artificial records and the one or more event records with one or more authentication codes; interleave, using the chaffing engine, the one or more artificial records and the one or more event records to generate an encrypted event log with one or more chaffed event records; and store the encrypted event log in an event database.

In some embodiments, the at least one processing device is further configured to tag the one or more event records, wherein tagging further comprises: generating, using the chaffing engine, one or more message authentication codes for the one or more event records; and tagging, using the chaffing engine, the one or more event records with the one or more message authentication codes.

In some embodiments, the at least one processing device is further configured to tag the one or more artificial records, wherein tagging further comprises: generating, using the chaffing engine, one or more random authentication codes for the one or more artificial records; and tagging, using the chaffing engine, the one or more artificial records with the one or more random authentication codes.

In some embodiments, the at least one processing device is further configured to: receive an access request from a computing device of a user to access the event log; initiate an authentication protocol to determine whether the user is authorized to access the event log; and initiate a winnowing engine on the event log based on at least determining that the user is authorized to access the event log.

In some embodiments, the at least one processing device is further configured to: initiate the authentication protocol, wherein initiating further comprises: transmitting, via the computing device of the user, an authentication request; receiving, via the computing device of the user, one or more authentication credentials from the user; validating the one or more authentication credentials; and determining that the user is authorized to access the event log based on at least validating the one or more authentication credentials.

In some embodiments, the at least one processing device is further configured to validate the one or more authentication credentials, wherein validating further comprises: determining an authorization level of the user based on at least the one or more authentication credentials; determining an authorization requirement associated with accessing the event log; determining that the authorization level of the user meets the authorization requirement associated with accessing the event log; and determining that the user is authorized to access the event log based on at least determining that the authorization level of the user meets the authorization requirement associated with accessing the event log.

In some embodiments, the at least one processing device is further configured to: initiate the winnowing engine on the encrypted event log based on at least determining that the user is authorized to access the event log; retrieve, using the winnowing engine, the one or more chaffed event records from the encrypted event log; identify, using the winnowing engine, the one or more event records from the one or more chaffed event records based on at least the one or more authentication codes associated with the one or more chaffed event records; and transmit control signals configured to cause the computing device of the user to display the one or more event records identified.

In some embodiments, the at least one processing device is further configured to identify the one or more event records from the one or more chaffed event records, wherein identifying further comprises retrieving the one or more chaffed event records that are tagged with the one or more message authentication codes.

In some embodiments, the at least one processing device is further configured to:
initiate a log correlation protocol on the one or more event records; cluster, using the log correlation protocol, the one or more event records into one or more groups based on the one or more action incidences; generate a representative event record for each of the one or more groups based on at least one or more log correlation rules; update the event log with the one or more representative event records generated for the one or more groups.

In some embodiments, the at least one processing device is further configured to: determine an exposure portfolio associated with the resource; determine one or more obfuscation requirements associated with the resource, wherein the one or more obfuscation requirements are determined based on the exposure portfolio; and initiate the chaffing engine on the event log associated with the resource based on at least the exposure portfolio, wherein the event log comprises the one or more event records.

In some embodiments, the at least one processing device is further configured to: determine a change in the exposure portfolio of the resource; determine a change in the one or more obfuscation requirements based on at least the change in the exposure portfolio of the resource; and initiate the chaffing engine on the event log associated with the resource based on at least the change in the exposure portfolio, wherein the event log comprises the one or more representative event records.

In another aspect, a computer program product for dynamic chaffing for log obfuscation based on shifting exposure portfolio is presented. The computer program product comprising a non-transitory computer-readable medium comprising code causing a first apparatus to: receive an event log from one or more sources associated with a resource, wherein the event log comprises one or more event records, wherein the one or more event records are generated based on one or more action incidences; initiate a chaffing engine on the event log; generate, using the chaffing engine, one or more artificial records based on at least the one or more event records; tag the one or more artificial records and the one or more event records with one or more authentication codes; interleave, using the chaffing engine, the one or more artificial records and the one or more event records to generate an encrypted event log with one or more chaffed event records; and store the encrypted event log in an event database.

In yet another aspect, a method for dynamic chaffing for log obfuscation based on shifting exposure portfolio is presented. The method comprising: receiving an event log from one or more sources associated with a resource, wherein the event log comprises one or more event records, wherein the one or more event records are generated based on one or more action incidences; initiating a chaffing engine on the event log; generating, using the chaffing engine, one or more artificial records based on at least the one or more event records; tagging the one or more artificial records and the one or more event records with one or more authentication codes; interleaving, using the chaffing engine, the one or more artificial records and the one or more event records to generate an encrypted event log with one or more chaffed event records; and storing the encrypted event log in an event database.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
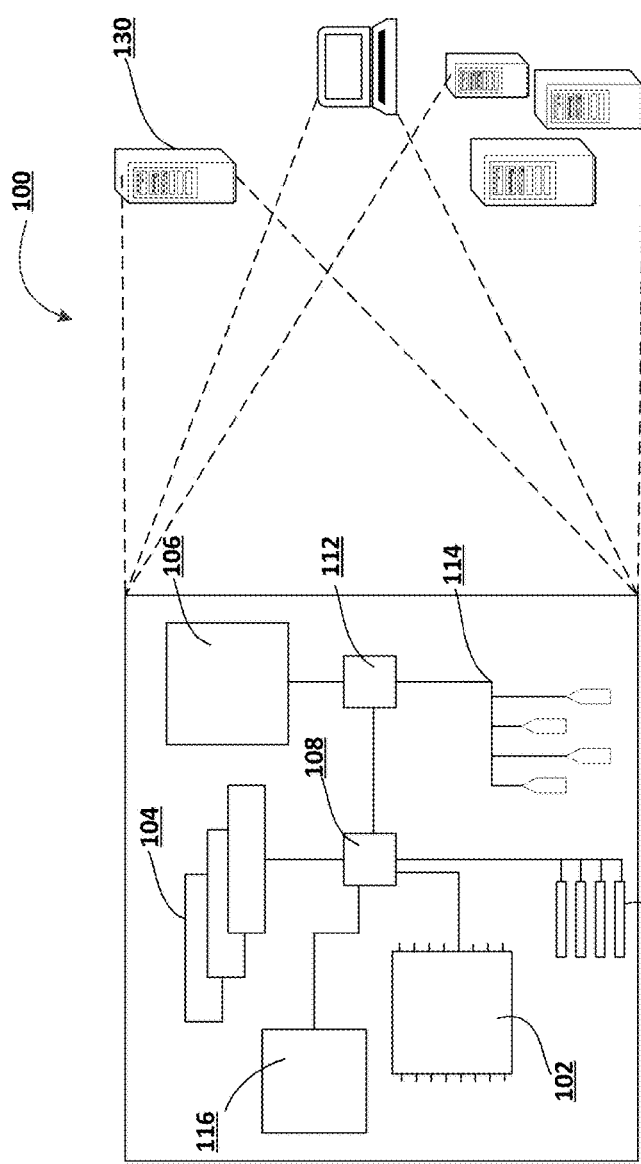
Figure 1:
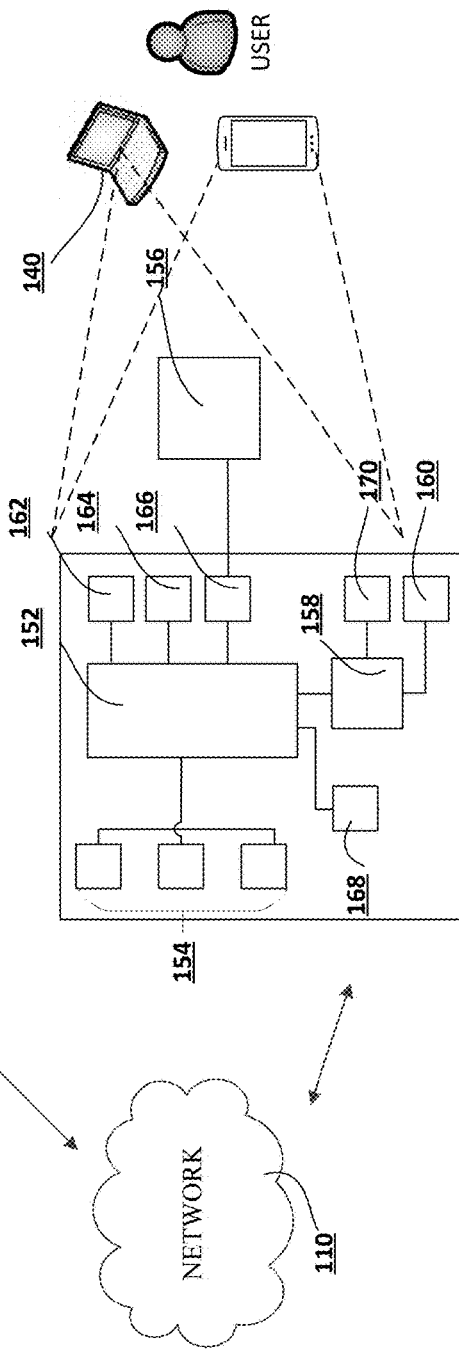
Figure 2:
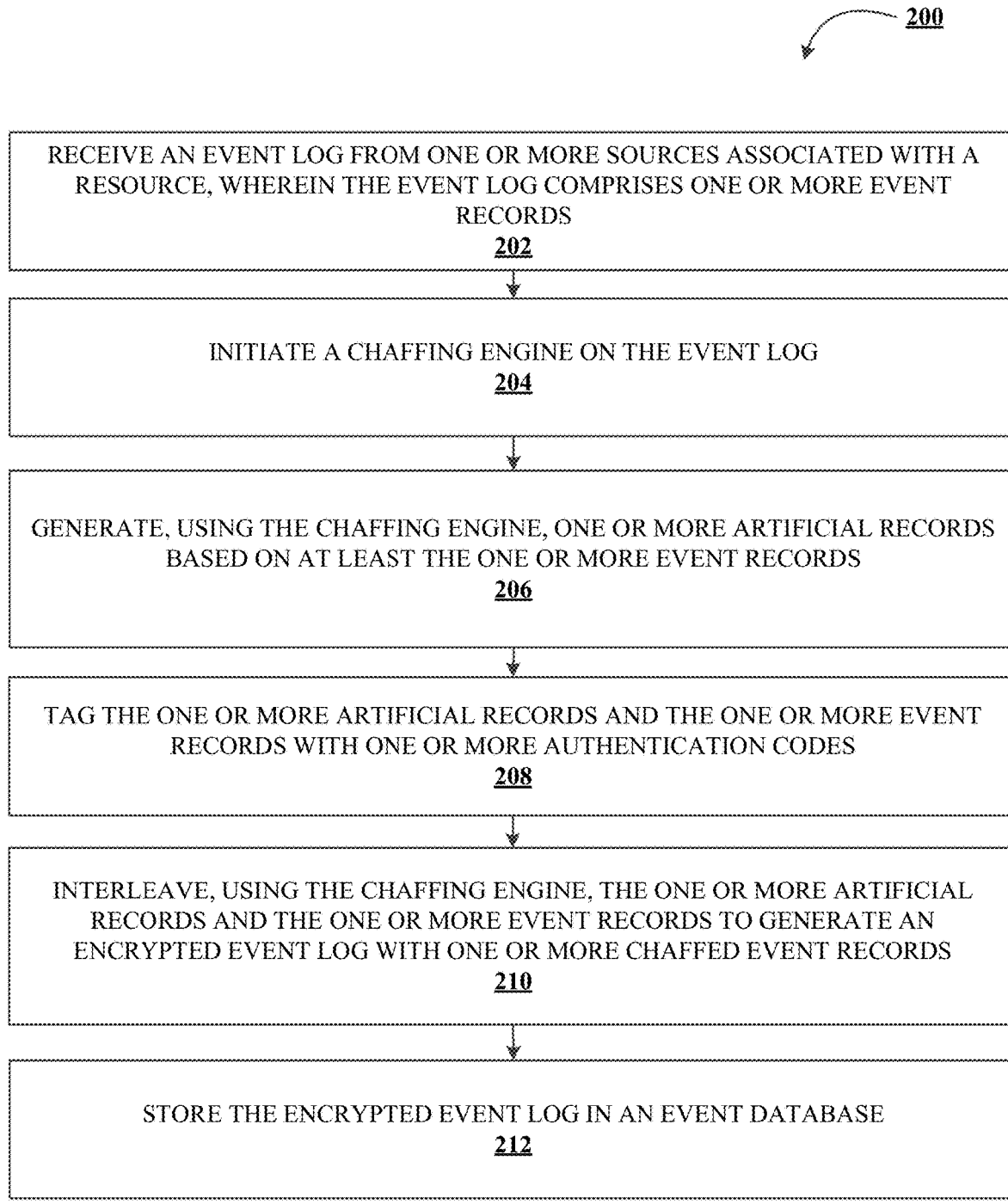
Figure 3:
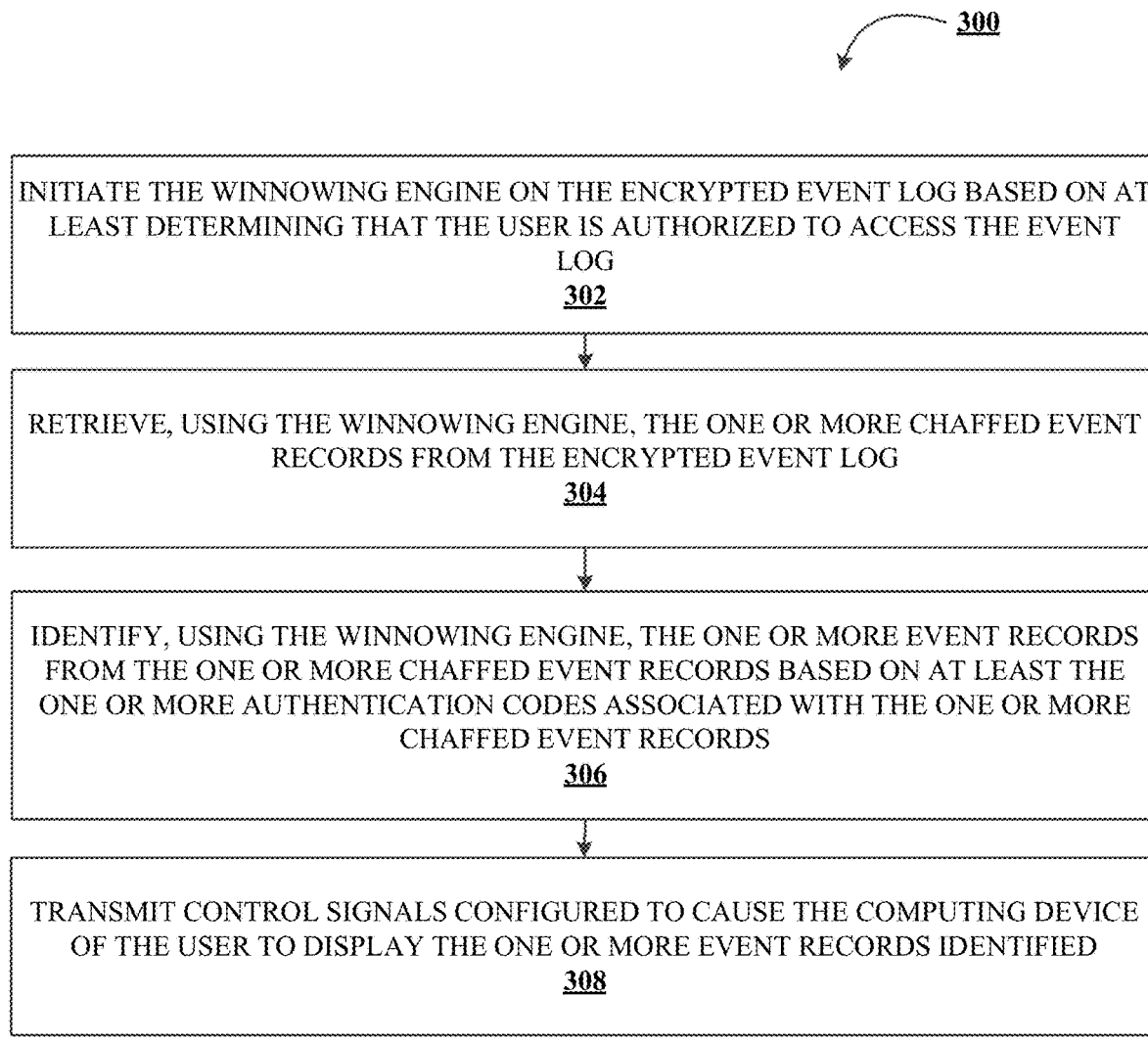

Having thus described embodiments of the invention in general terms, reference will now be made the accompanying drawings, wherein:

FIG. 1 illustrates technical components of a system for dynamic chaffing for log obfuscation based on shifting exposure portfolio, in accordance with an embodiment of the invention;

FIG. 2 illustrates a process flow for dynamic chaffing for log obfuscation based on shifting exposure portfolio, in accordance with an embodiment of the invention; and FIG. 3 illustrates a process flow for dynamic winnowing for log obfuscation based on shifting exposure portfolio, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of a computer program, or part of a computer program that serves as a foundation for a larger piece of software and drives the functionality of the software. An engine may be self-contained, but externally-controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some embodiments, an engine may be configured to retrieve resources created in other computer programs, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

As used herein, a "resource" may refer to electronic components associated with the technology infrastructure (e.g., system environment described herein) of the entity. These electronic components include software components such as applications, databases, data files, and/or the like, hardware components such as computing devices, network devices, and/or the like, network components such as server, client, peer, transmission medium, connecting devices, and/or the like, and any other electronic component associated with the technology infrastructure.

FIG. 1 presents an exemplary block diagram of the system environment for dynamic chaffing for log obfuscation based on shifting exposure portfolio 100, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a user input system 140. In some embodiments, the system 130, and the user input system 140 may be used to implement the processes described herein, in accordance with an embodiment of the present invention. In this regard, the system 130 and/or the user input system 140 may include one or more applications stored thereon that are configured to interact with one another to implement any one or more portions of the various user interfaces and/or process flow described herein.

In accordance with embodiments of the invention, the system 130 is intended to represent various forms of digital computers, such as laptops, desktops, video recorders, audio/video player, radio, workstations, personal digital assistants, servers, wearable devices, Internet-of-things devices, augmented reality (AR) devices, virtual reality (VR) devices, extended reality (XR) devices automated teller machine devices, electronic kiosk devices, blade servers, mainframes, or any combination of the aforementioned. In accordance with embodiments of the invention, the user input system 140 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the network 110, a number of other computing devices (not shown) in addition to the user input system 140. In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes during the lifetime of an application and allows memory reuse for better utilization of the memory resources when the data sizes are large.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown).

In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1 also illustrates a user input system 140, in accordance with an embodiment of the invention. The user input system 140 includes a processor 152, memory 154, an input/output device such as a display 156, a communication interface 158, and a transceiver 160, among other components. The user input system 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input system 140, including instructions stored in the memory 154. The processor may be implemented as a chipset of chips that include separate and multiple analog and digital processors. The processor may be configured to provide, for example, for coordination of the other components of the user input system 140, such as control of user interfaces, applications run by user input system 140, and wireless communication by user input system 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input system 140 with other devices. External interface 168 may provide, for example, for wired communication in some implementations, or for wireless communication in other implementations, and multiple interfaces may also be used.

The memory 154 stores information within the user input system 140. The memory 154 can be implemented as one or more of a computer-readable medium or media, a volatile memory unit or units, or a non-volatile memory unit or units. Expansion memory may also be provided and connected to user input system 140 through an expansion interface (not shown), which may include, for example, a SIMM (Single In Line Memory Module) card interface. Such expansion memory may provide extra storage space for user input system 140 or may also store applications or other information therein. In some embodiments, expansion memory may include instructions to carry out or supplement the processes described above and may include secure information also. For example, expansion memory may be provided as a security module for user input system 140 and may be programmed with instructions that permit secure use of user input system 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer-or machine-readable medium, such as the memory 154, expansion memory, memory on processor 152, or a propagated signal that may be received, for example, over transceiver 160 or external interface 168.

In some embodiments, the user may use the user input system 140 to transmit and/or receive information or commands to and from the system 130 via the network 110. Any communication between the system 130 and the user input system 140 (or any other computing devices) may be subject to an authentication protocol allowing the system 130 to maintain security by permitting only authenticated users (or processes) to access the protected resources of the system 130, which may include servers, databases, applications, and/or any of the components described herein. To this end, the system 130 may require the user (or process) to provide authentication credentials to determine whether the user (or process) is eligible to access the protected resources. Once the authentication credentials are validated and the user (or process) is authenticated, the system 130 may provide the user (or process) with permissioned access to the protected resources. Similarly, the user input system 140 (or any other computing devices) may provide the system 130 with permissioned to access the protected resources of the user input system 130 (or any other computing devices), which may include a GPS device, an image capturing component (e.g., camera), a microphone, a speaker, and/or any of the components described herein.

The user input system 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation—and location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker, e.g., in a handset of user input system 140. Such sound may include sound from voice telephone calls, may include recorded sound (e.g., voice messages, music files, etc.) and may also include sound generated by one or more applications operating on the user input system 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a technical environment that includes a back end component (e.g., as a data server), that includes a middleware component (e.g., an application server), that includes a front end component (e.g., a client computer having a graphical user interface or a Web browser through which a user can interact with an implementation of the systems and techniques described here), or any combination of such back end, middleware, or front end components.

As shown in FIG. 1, the components of the system 130 and the user input system 140 are interconnected using the network 110. The network 110, which may be include one or more separate networks, be a form of digital communication network such as a telecommunication network, a local area network ("LAN"), a wide area network ("WAN"), a global area network ("GAN"), the Internet, or any combination of the foregoing. It will also be understood that the network 110 may be secure and/or unsecure and may also include wireless and/or wired and/or optical interconnection technology.

In accordance with an embodiments of the invention, the components of the system environment 100, such as the system 130 and the user input system 140 may have a client-server relationship, where the user input system 130 makes a service request to the system 130, the system 130 accepts the service request, processes the service request, and returns the requested information to the user input system 140, and vice versa. This relationship of client and server typically arises by virtue of computer programs running on the respective computers and having a client-server relationship to each other.

It will be understood that the embodiment of the system environment 100 illustrated in FIG. 1 is exemplary and that other embodiments may vary. As another example, in some embodiments, the system environment may include more, fewer, or different components. As another example, in some embodiments, some or all of the portions of the system environment 100 may be combined into a single portion. Likewise, in some embodiments, some or all of the portions of the system 130 may be separated into two or more distinct portions.

FIG. 2 illustrates a process flow for dynamic chaffing for log obfuscation based on shifting exposure portfolio 200, in accordance with an embodiment of the invention. As shown in block 202, the process flow includes receiving an event log from one or more sources associated with a resource, wherein the event log comprises one or more event records. An event log may be a local file that chronicles each event record associated with an action incidence, or "happenings" that occur with the resource. Event records may be automatically generated for action incidences. Examples of action incidences may include, but are not limited to, accessing, deleting, adding a file or an application, modifying the resource's date, shutting down the resource, error incidences, changing the resource configuration, and/or the like.

In some embodiments, each resource may be associated with one or more sources. A source may be any software and/or hardware component associated with the resource. When an action incidence occurs, each source connected to the resource may be affected in some way. In such cases, each source may be capable of generating an event record for the same action incidence. As an example, a resource may include a number of applications installed thereon, where each application may be a source. Each application may have client event records, event records from a load balancer, event records from a web server, database event records, event records from worker services that handle longer-running tasks, and/or the like. A resource with more advance capabilities will have a more expansive event record and multiple event logs. Event records generated by each source may have a unique format, amplifying the difficulty of tracing the action incidence using the event records. To address these issues, the system may be configured to initiate a log correlation protocol on the one or more event records.

In some embodiments, the log correlation protocol may be used to move all the logs to a centralized location and determine, using pattern matching software, which parts of disparate event records across the various sources represent the same action incidence. In response, the log correlation protocol may be configured to cluster the one or more event records into one or more groups based on the one or more action incidences. Once clustered, the log correlation protocol may be configured to generate a representative event record for each of the one or more groups based on at least one or more log correlation rules. As an example, log correlation rules specifies which sequences of event records should be indicative of a particular action incidence, specific time windows during which event records are recorded that are identifiable based on individual time stamps, specific types of event records that in combination identify the specific type of action incidence, and/or the like. A representative event log may be used to identify the action incidence and reduce the amount of memory used when storing the event log. In response, the system may be configured to update the event log with the one or more representative event records generated for the one or more groups.

In some embodiments, the system may be configured to determine an exposure portfolio associated with the resource. In one aspect, the exposure portfolio may be based on an exposure landscape associated with the resource. An exposure landscape may include a collection of potential exposures that may affect a particular resource within a domain or context. In one aspect, the exposure landscape may identify vulnerabilities in the resource, exposure vectors involved, and observed trends. An exposure landscape can be broad, including an entire range of potentials exposures, or targeted at each resource within a particular sector or domain. Exposure landscapes may often shift and vary based on the particular time horizon involved, including current exposure landscapes, emergent exposure landscape, and future exposure landscapes, that reflect exposure to deployments of new technology, often characterized by a low maturity regarding technical vulnerabilities.

Based on the exposure landscape, the system may be configured to generate the exposure portfolio for the resource. In one aspect, the exposure portfolio may include exposure vectors capable of manipulating resource element issues (e.g., gaps, redundancies, and/or deficiencies in elements of the resource) that could result in exposure to the resource. Exposure vectors are security pressures to the resource and/or the entity. These security pressures may include any type of pressure to the resource, such as but not limited to data exfiltration (e.g., extraction, loss, of intellectual property data, customer data, financial data, entity data, or any other type of data), resource damage (e.g., viruses, physical damage, or the like), operational exposure (e.g., resource downtime, process downtime, manufacturing downtime, or the like), or any other like exposure to which a resource could be exposed. As such, the exposure vectors may illustrate the individual components of the exposures.

In response, the system may be configured to determine one or more obfuscation requirements associated with the resource, wherein the one or more obfuscation requirements are determined based on the exposure portfolio. In some embodiments, the obfuscation requirements may identify specific aspects of the resources (e.g., event log) that need to be obfuscation and/or protected to mitigate any exposure vectors. These aspects may relate to users, processes, and/or technologies that can use and/or have access to the specific aspects of the resource. Based on the obfuscation requirements, the system may be configured to determine resource obfuscation tools. In some embodiments, the resource obfuscation tools may include the processes in place for allowing access to the specific aspects of the resource and/or the technology used (in-house and/or third party technology) associated with the obfuscation of the specific aspects of the resource.

One such technology/process is the chaffing and winnowing encryption method. Chaffing and winnowing are dual components of a privacy-enhancement scheme that does not require encryption. The technique consists of adding false packets to a file, and then removing the false packets when the file is accessed by authorized recipients. The false packets obscure the contents of the file and render the file unintelligible to anyone except authorized personnel. In some embodiments, the system may be configured to initiate the chaffing engine on the event log associated with the resource based on at least the exposure portfolio.

Next, as shown in block 204, the process flow includes initiating a chaffing engine on the event log. In some embodiments, the system may be configured to initiate the chaffing engine on the event log with one or more event records based on a current exposure portfolio of the resource. However, the exposure portfolio of the resource may change based on their exposure landscape. In this regard, the system may be configured to continuously monitor the exposure landscape for each resource. By monitoring the exposure landscape of a resource, any shift in the exposure landscape may be captured and recorded. Based on the captured shift in the exposure landscape of the resource, the system may be configured to update the exposure portfolio for the resource accordingly. Any change to the exposure portfolio may trigger a change in the obfuscation requirements for the resource. If the monitoring requirements change, the implementation of obfuscation tools on the specific aspects of the resource may need re-evaluation. In such cases, the system may be configured to initiate the chaffing engine on the event log with the one or more representative event records based on the changed exposure portfolio. Event logs with event records may have increased processing requirements to implement chaffing and winnowing compared to event logs with representative event records. However, implementing chaffing and winnowing on event records before correlation may result in a more secure obfuscation compared to implementing chaffing and winnowing on representative event records, i.e., event records post correlation. Based on the exposure portfolio of the resource, the system may be configured to dynamically determine whether the chaffing engine is implemented on the event log with event records or on event log with representative event records.

Next, as shown in block 206, the process flow includes generating, using the chaffing engine, one or more artificial records based on at least the one or more event records. In some embodiments, the system may be configured to generate synthetic data (artificial records) based on real data (event records) while ensuring that the important statistical properties of real data are reflected in the synthetic data.

Next, as shown in block 208, the process flow includes tagging the one or more artificial records and the one or more event records with one or more authentication codes. In this regard, the system may be configured to generate, using the chaffing engine, one or more message authentication codes for the one or more event records. In response, the system may be configured to tag, using the chaffing engine, the one or more event records with the one or more message authentication codes. Similarly, the system may be configured to generate, using the chaffing engine, one or more random authentication codes for the one or more artificial records. In response, the system may be configured to tag, using the chaffing engine, the one or more artificial records with the one or more random authentication codes. By tagging the event records with message authentication codes and artificial records with random authentication codes allows for easier identification and filtration of event records from the artificial records before being presented to authorized personnel.

Next, as shown in block 210, the process flow includes interleaving, using the chaffing engine, the one or more artificial records and the one or more event records to generate an encrypted event log with one or more chaffed event records. By interleaving the artificial records with the event records in a pseudo-random pattern, the system may be configured to generate chaffed event records that are cryptographically secure without using process heavy encryption techniques. As the event records are mixed with the artificial records, any unauthorized personnel will not know which of the chaffed event records are the real event records and which of the chaffed event records are artificial records. The tags are protected and stored by the system in a digital key repository and are retrieved and used only when authorized personnel request access to the event log.

Next, as shown in block 212, the process flow includes storing the encrypted event log in an event database. In some embodiments, the system may be configured to receive an access request from a computing device of a user to access the event log. In response, the system may be configured to initiate an authentication protocol to determine whether the user is authorized to access the event log. In this regard, the system may be configured to transmit, via the computing device of the user, an authentication request. In response, the system may be configured to receive, via the computing device of the user, one or more authentication credentials from the user. In response, the system may be configured to validate the one or more authentication credentials. In this regard, the system may be configured to determine an authorization level of the user based on at least the one or more authentication credentials. In addition, the system may be configured to determine an authorization requirement associated with accessing the event log. In response, the system may be configured to determine that the authorization level of the user meets the authorization requirement associated with accessing the event log. In response, the system may be configured to determine that the user is authorized to access the event log based on at least determining that the authorization level of the user meets the authorization requirement associated with accessing the event log. In response, the system may be configured to initiate a winnowing engine on the event log based on at least determining that the user is authorized to access the event log.

FIG. 3 illustrates a process flow for dynamic winnowing for log obfuscation based on shifting exposure portfolio 300, in accordance with an embodiment of the invention. As shown in block 302, the process flow includes initiating the winnowing engine on the encrypted event log based on at least determining that the user is authorized to access the event log. Next, as shown in block 302, the process flow includes retrieving, using the winnowing engine, the one or more chaffed event records from the encrypted event log. Next, as shown in block 304, the process flow includes identifying, using the winnowing engine, the one or more event records from the one or more chaffed event records based on at least the one or more authentication codes associated with the one or more chaffed event records. In this regard, the system may be configured to retrieving the one or more chaffed event records that are tagged with the one or more message authentication codes. Next, as shown in block 306, the process flow includes transmitting control signals configured to cause the computing device of the user to display the one or more event records identified.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for dynamic chaffing for log obfuscation based on shifting exposure portfolio, the system comprising:
at least one non-transitory storage device; and at least one processing device coupled to the at least one non-transitory storage device, wherein the at least one processing device is configured to:
  receive an event log from one or more sources associated with a resource, wherein the event log comprises one or more event records, wherein the one or more event records are generated based on one or more action incidences;
  initiate a chaffing engine on the event log;
  generate, using the chaffing engine, one or more artificial records based on at least the one or more event records;
  tag the one or more artificial records and the one or more event records with one or more authentication codes, wherein tagging the one or more artificial records further comprises:
  generating, using the chaffing engine, one or more random authentication codes for the one or more artificial records; and
  tagging, using the chaffing engine, the one or more artificial records with the one or more random authentication codes;
  interleave, using the chaffing engine, the one or more artificial records and the one or more event records to generate an encrypted event log with one or more chaffed event records; and
  store the encrypted event log in an event database.

2. The system of claim 1, wherein the at least one processing device is further configured to tag the one or more event records, wherein tagging further comprises:
  generating, using the chaffing engine, one or more message authentication codes for the one or more event records; and
  tagging, using the chaffing engine, the one or more event records with the one or more message authentication codes.

3. The system of claim 2, wherein the at least one processing device is further configured to:
  receive an access request from a computing device of a user to access the event log;
  initiate an authentication protocol to determine whether the user is authorized to access the event log; and
  initiate a winnowing engine on the event log based on at least determining that the user is authorized to access the event log.

4. The system of claim 3, wherein the at least one processing device is further configured to:
  initiate the authentication protocol, wherein initiating further comprises:
    transmitting, via the computing device of the user, an authentication request;
    receiving, via the computing device of the user, one or more authentication credentials from the user;
    validating the one or more authentication credentials; and
    determining that the user is authorized to access the event log based on at least validating the one or more authentication credentials.

5. The system of claim 4, wherein the at least one processing device is further configured to validate the one or more authentication credentials, wherein validating further comprises:
  determining an authorization level of the user based on at least the one or more authentication credentials;
  determining an authorization requirement associated with accessing the event log;
  determining that the authorization level of the user meets the authorization requirement associated with accessing the event log; and
  determining that the user is authorized to access the event log based on at least determining that the authorization level of the user meets the authorization requirement associated with accessing the event log.

6. The system of claim 5, wherein the at least one processing device is further configured to:
  initiate the winnowing engine on the encrypted event log based on at least determining that the user is authorized to access the event log;
  retrieve, using the winnowing engine, the one or more chaffed event records from the encrypted event log;
  identify, using the winnowing engine, the one or more event records from the one or more chaffed event records based on at least the one or more authentication codes associated with the one or more chaffed event records; and
  transmit control signals configured to cause the computing device of the user to display the one or more event records identified.

7. The system of claim 6, wherein the at least one processing device is further configured to identify the one or more event records from the one or more chaffed event records, wherein identifying further comprises retrieving the one or more chaffed event records that are tagged with the one or more message authentication codes.

8. The system of claim 7, wherein the at least one processing device is further configured to:
  initiate a log correlation protocol on the one or more event records;
  cluster, using the log correlation protocol, the one or more event records into one or more groups based on the one or more action incidences;
  generate a representative event record for each of the one or more groups based on at least one or more log correlation rules;
  update the event log with the one or more representative event records generated for the one or more groups.

9. The system of claim 8, wherein the at least one processing device is further configured to:
  determine an exposure portfolio associated with the resource;
  determine one or more obfuscation requirements associated with the resource, wherein the one or more obfuscation requirements are determined based on the exposure portfolio; and
  initiate the chaffing engine on the event log associated with the resource based on at least the exposure portfolio, wherein the event log comprises the one or more event records.

10. The system of claim 9, wherein the at least one processing device is further configured to:
  determine a change in the exposure portfolio of the resource;
  determine a change in the one or more obfuscation requirements based on at least the change in the exposure portfolio of the resource; and
  initiate the chaffing engine on the event log associated with the resource based on at least the change in the exposure portfolio, wherein the event log comprises the one or more representative event records.

11. A computer program product for dynamic chaffing for log obfuscation based on shifting exposure portfolio, the computer program product comprising a non-transitory computer-readable medium comprising code causing a first apparatus to:
- receive an event log from one or more sources associated with a resource, wherein the event log comprises one or more event records, wherein the one or more event records are generated based on one or more action incidences;
- initiate a chaffing engine on the event log;
- generate, using the chaffing engine, one or more artificial records based on at least the one or more event records;
- tag the one or more artificial records and the one or more event records with one or more authentication codes, wherein tagging the one or more artificial records further comprises:
  - generating, using the chaffing engine, one or more random authentication codes for the one or more artificial records; and
    - tagging, using the chaffing engine, the one or more artificial records with the one or more random authentication codes;
  - interleave, using the chaffing engine, the one or more artificial records and the one or more event records to generate an encrypted event log with one or more chaffed event records; and
  - store the encrypted event log in an event database.

12. The computer program product of claim 11, wherein the first apparatus is further configured to tag the one or more event records, wherein tagging further comprises:
- generating, using the chaffing engine, one or more message authentication codes for the one or more event records; and
- tagging, using the chaffing engine, the one or more event records with the one or more message authentication codes.

13. The computer program product of claim 12, wherein the first apparatus is further configured to:
- receive an access request from a computing device of a user to access the event log;
- initiate an authentication protocol to determine whether the user is authorized to access the event log; and
- initiate a winnowing engine on the event log based on at least determining that the user is authorized to access the event log.

14. The computer program product of claim 13, wherein the first apparatus is further configured to:
- initiate the authentication protocol, wherein initiating further comprises:
  - transmitting, via the computing device of the user, an authentication request;
  - receiving, via the computing device of the user, one or more authentication credentials from the user;
  - validating the one or more authentication credentials; and
  - determining that the user is authorized to access the event log based on at least validating the one or more authentication credentials.

15. The computer program product of claim 14, wherein the first apparatus is further configured to validate the one or more authentication credentials, wherein validating further comprises:
- determining an authorization level of the user based on at least the one or more authentication credentials;
- determining an authorization requirement associated with accessing the event log;
- determining that the authorization level of the user meets the authorization requirement associated with accessing the event log; and
- determining that the user is authorized to access the event log based on at least determining that the authorization level of the user meets the authorization requirement associated with accessing the event log.

16. The computer program product of claim 15, wherein the first apparatus is further configured to:
- initiate the winnowing engine on the encrypted event log based on at least determining that the user is authorized to access the event log;
- retrieve, using the winnowing engine, the one or more chaffed event records from the encrypted event log;
- identify, using the winnowing engine, the one or more event records from the one or more chaffed event records based on at least the one or more authentication codes associated with the one or more chaffed event records; and
- transmit control signals configured to cause the computing device of the user to display the one or more event records identified.

17. The computer program product of claim 16, wherein the first apparatus is further configured to identify the one or more event records from the one or more chaffed event records, wherein identifying further comprises retrieving the one or more chaffed event records that are tagged with the one or more message authentication codes.

18. A method for dynamic chaffing for log obfuscation based on shifting exposure portfolio, the method comprising:
- receiving an event log from one or more sources associated with a resource, wherein the event log comprises one or more event records, wherein the one or more event records are generated based on one or more action incidences;
- initiating a chaffing engine on the event log;
- generating, using the chaffing engine, one or more artificial records based on at least the one or more event records;
- tagging the one or more artificial records and the one or more event records with one or more authentication codes, wherein tagging the one or more artificial records further comprises:
  - generating, using the chaffing engine, one or more random authentication codes for the one or more artificial records; and
  - tagging, using the chaffing engine, the one or more artificial records with the one or more random authentication codes;
- interleaving, using the chaffing engine, the one or more artificial records and the one or more event records to generate an encrypted event log with one or more chaffed event records; and
- storing the encrypted event log in an event database.

* * * * *